US011170727B2

(12) United States Patent
Choi et al.

(10) Patent No.: US 11,170,727 B2
(45) Date of Patent: Nov. 9, 2021

(54) DISPLAY DEVICE INCLUDING A COMMON VOLTAGE COMPENSATION CIRCUIT, AND METHOD FOR DRIVING THE SAME

(71) Applicant: LG Display Co., Ltd., Seoul (KR)

(72) Inventors: SunHyun Choi, Paju-si (KR); Kyungun Kim, Gyeongsangbuk-do (KR); YongJun Shin, Daegu (KR); YoungDo Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/074,211

(22) Filed: Oct. 19, 2020

(65) Prior Publication Data

US 2021/0158769 A1 May 27, 2021

(30) Foreign Application Priority Data

Nov. 22, 2019 (KR) ........................ 10-2019-0151733

(51) Int. Cl.
*G06F 3/038* (2013.01)
*G09G 5/00* (2006.01)
*G09G 3/36* (2006.01)

(52) U.S. Cl.
CPC ......... *G09G 3/3655* (2013.01); *G09G 3/3677* (2013.01); *G09G 2320/0257* (2013.01)

(58) Field of Classification Search
None
See application file for complete search history.

(56) References Cited

U.S. PATENT DOCUMENTS

2006/0164587 A1* 7/2006 Oh ........................ G09G 3/3611 349/152
2014/0028535 A1* 1/2014 Min ..................... G09G 3/3655 345/87
2014/0184964 A1* 7/2014 Byeon ............... G02F 1/136227 349/33
2016/0147105 A1* 5/2016 Ha ...................... G02F 1/13452 349/33

* cited by examiner

*Primary Examiner* — Kirk W Hermann
(74) *Attorney, Agent, or Firm* — Fenwick & West LLP

(57) ABSTRACT

A display panel includes left and right common voltage lines in opposite side edges, horizontal common voltage lines connecting the left and right common voltage lines, and vertical common voltage lines, a printed circuit board including one or more integrated circuits, and a common voltage compensation circuit supplies a common voltage to the left and right common voltage lines while supplying the common voltage through the integrated circuits to the vertical common voltage lines.

17 Claims, 11 Drawing Sheets

DISPLAY DEVICE INCLUDING A COMMON VOLTAGE COMPENSATION CIRCUIT, AND METHOD FOR DRIVING THE SAME

CROSS-REFERENCE TO RELATED APPLICATION

This application claims priority from Republic of Korea Patent Application No. 10-2019-0151733, filed on Nov. 22, 2019, which is incorporated by reference in its entirety.

BACKGROUND

Field

Embodiments of the disclosure relate to a display device and a method for driving the same.

Description of Related Art

The growth of the intelligence society leads to diversified needs for displays and wide use of various forms of displays, such as liquid crystal display (LCD), plasma display panel (PDP), or organic light emitting display (OLED).

An LCD displays images by adjusting the light transmittance of liquid crystals using electric fields. To that end, an LCD includes a liquid display panel in which liquid crystal cells are arrayed in a matrix pattern and driving circuit for driving the liquid crystal panel.

In the pixel array of the liquid crystal panel, multiple gate lines and data lines cross each other, and thin film transistors (TFTs) are formed at the crossings of the gate and data lines. The liquid crystal panel has storage capacitors to maintain the voltage of the liquid crystal cells. Each liquid crystal cell includes a pixel electrode, a common electrode, and a liquid crystal layer.

The liquid crystal layer of the liquid crystal cells creates an electric field by a data voltage applied to the pixel electrode and a common voltage applied to the common electrode. As the amount of light transmitted through the liquid crystal layer is adjusted by the electric field, an image is displayed.

A recent trend in such display devices is the implementation of a large screen, high resolution and high frequency, and slim bezel. For high transmittance purposes, the narrow common voltage lines arranged in the display panel, and the narrow intervals between the common voltage lines and gate lines or data lines are required.

However, an increased screen size and reduced common voltage line width may cause more distortion (e.g., ripples) of the common voltage. In particular, differences in the level of common voltages due to signal delay may be increased depending on where the common voltage lines in the display panel are electrically connected with the common voltage compensation circuit.

In other words, even in the same common voltage line, a deviation in common voltage may arise between where the common voltage is applied and its opposite portion, causing afterimages or other quality deterioration.

SUMMARY

According to various embodiments of the disclosure, there may be provided a display device and method for driving the same, which may enhance image quality by reducing the signal delay of common voltage supplied to the display panel.

According to various embodiments of the disclosure, there may be provided a display device and method for driving the same, which may reduce the signal delay of common voltage and enhance image quality by arranging common voltage lines, which apply common voltage to the display panel, simultaneously along the horizontal and vertical directions.

According to various embodiments of the disclosure, there may be provided a display device and method for driving the same, which may raise the transfer efficiency of common voltage by forming the common voltage line, which applies common voltage to the display panel, with a metal layer in various structures.

According to an embodiment, a display device comprises a display panel including a left common voltage line and a right common voltage line formed along two opposite side edge areas, a plurality of horizontal common voltage lines connecting the left common voltage line and the right common voltage line and arranged in a display area, and a plurality of vertical common voltage lines arranged to cross the horizontal common voltage lines, a printed circuit board including one or more integrated circuits formed thereon to supply data voltage through data lines to the display panel, and a common voltage compensation circuit supplying a common voltage to the left common voltage line and the right common voltage line while simultaneously supplying the common voltage through the integrated circuits to the vertical common voltage lines.

According to an embodiment, the left common voltage line and the right common voltage line may be connected to a left feedback line and a right feedback line which are disposed outside a gate driving circuit supplying a gate driving voltage to the display area, respectively, to feed the common voltage back to the common voltage compensation circuit.

According to an embodiment, the vertical common voltage lines may include one or more signal lines connected from one of the integrated circuits to the display panel.

According to an embodiment, the vertical common voltage lines may be merged from a plurality of the integrated circuits into one signal line connected to the display panel.

According to an embodiment, each of the vertical common voltage lines may be formed on a gate layer or a source/drain layer.

According to an embodiment, each of the vertical common voltage lines may be formed alternately on a gate layer and a source/drain layer.

According to an embodiment, each of the vertical common voltage lines may include a first signal line extending from one of the integrated circuits and formed on a gate layer, a second signal line extending from the one of the integrated circuits and formed on a source/drain layer in a direction parallel with the gate layer, and a jumping wire connecting the first signal line and the second signal line and connected to the display panel.

According to an embodiment, the common voltage compensation circuit may include an operational amplifier receiving, via a first resistor and an inverting input terminal, the common voltage fed back from the display panel through the left feedback line or the right feedback line and a reference voltage via a non-inverting input terminal.

According to an embodiment, the display device may further comprise an auxiliary horizontal common voltage line disposed in an edge area of the display panel opposite to the integrated circuits. The auxiliary horizontal common voltage line may be connected to the horizontal common voltage lines positioned in the display area, in one or more nodes.

According to an embodiment, a method for driving a display device comprises supplying a common voltage to a plurality of horizontal common voltage lines through a left common voltage line and a right common voltage line formed along two opposite side edge areas, the horizontal common voltage lines connected with the left common voltage line and the right common voltage line and arranged in a display area of a display panel, supplying the common voltage to a plurality of vertical common voltage lines arranged to cross the horizontal common voltage lines, receiving the common voltage fed back from the display panel, through a feedback line connected to the left common voltage line or the right common voltage line, and compensating for the fed-back common voltage according to a predetermined compensation ratio and outputting the compensated common voltage.

According to various embodiments of the disclosure, there may be provided a display device and method for driving the same, which may enhance image quality by reducing the signal delay of common voltage supplied to the display panel.

According to various embodiments of the disclosure, there may be provided a display device and method for driving the same, which may reduce the signal delay of common voltage and enhance image quality by arranging common voltage lines, which apply common voltage to the display panel, simultaneously along the horizontal and vertical directions.

According to various embodiments of the disclosure, there may be provided a display device and method for driving the same, which may raise the transfer efficiency of common voltage by forming the common voltage line, which applies common voltage to the display panel, with a metal layer in various structures.

BRIEF DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
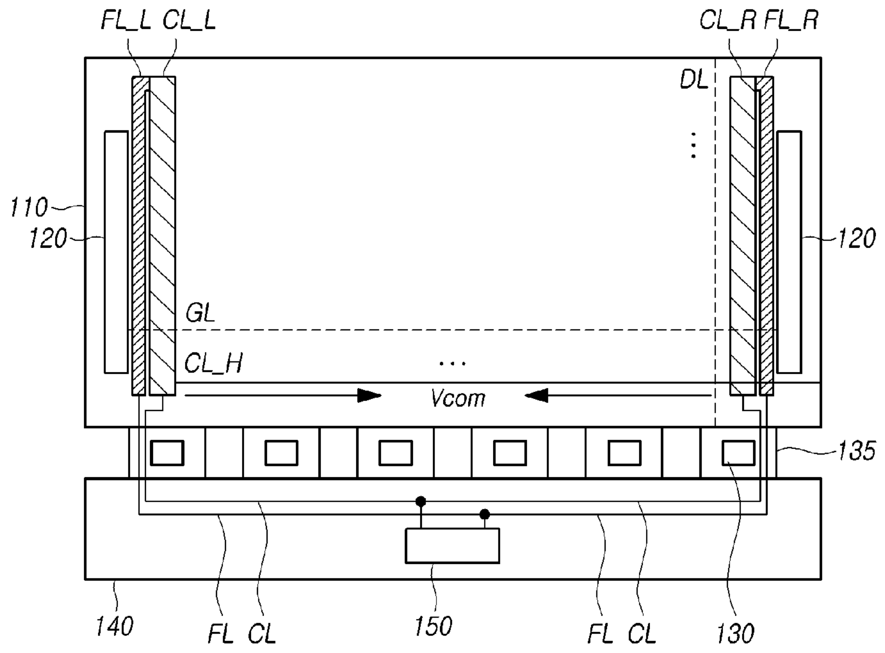
FIG. 1 is a view illustrating a structure in which a common voltage is supplied in a display device according to an embodiment.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” may be used herein to describe elements of the present invention. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element may be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term “may” fully encompasses all the meanings of the term “can”.

FIG. 1 is a view illustrating a structure in which a common voltage is supplied in a display device.

Referring to FIG. 1, a display device 100 includes a display panel 110 for displaying images, a gate driving circuit 120 and data driving circuit 130 for driving the display panel 110, and a common voltage compensation circuit 150 for supplying a common voltage Vcom to the display panel 110.

The gate driving circuit 120 is mounted on a side edge of the display panel 110. The data driving circuit 130, as providing data voltages in a direction perpendicular to the gate driving circuit 120, is mounted and attached inside a flexible printed circuit board (FPCB) 135.

Inside the display panel 110, a plurality of gate lines GL and a plurality of data lines DL cross each other to form pixel areas and, a thin film transistor TFT and a storage capacitor are formed in each pixel area.

The gate driving circuit 120 sequentially supplies gate driving voltages to the gate lines GL in each horizontal period (1H) according to a plurality of gate control signals from a timing controller (not shown) mounted on a main printed circuit board 140.

The data driving circuit 130 supplies data voltages to the pixel areas through all the data lines DL in each horizontal period (1H) in response to data control signals from the timing controller.

The common voltage compensation circuit 150 adopts a compensation circuit using inverse amplification to reduce variations in the common voltage Vcom applied to the display panel 110.

For the above purpose, the common voltage compensation circuit 150 continuously receives the common voltage Vcom fed back via a feedback line FL from the display panel 110, and outputs a common voltage Vcom compensated according to a predetermined compensation ratio through the common voltage line CL, thereby controlling the common voltage Vcom supplied to the display panel 110 to be constant.

The common voltage Vcom is supplied to a left common voltage line CL_L and a right common voltage line CL_R via the common voltage line CL extending from the common voltage compensation circuit 150, and the common voltage Vcom is applied to the inside of the display panel 110 from each of the left common voltage line CL_L and the right common voltage line CL_R.

The line supplying the common voltage Vcom from the left common voltage line CL_L or the right common voltage line CL_R to the display area of the display panel 110 along the horizontal direction may be denoted as a horizontal common voltage line CL_H.

The horizontal common voltage line CL_H applies the common voltage Vcom to a first electrode of the storage capacitor, and the data line DL applies data voltage to a second electrode of the storage capacitor through the thin film transistor TFT, thereby displaying an image by the electric field between the two electrodes.

The horizontal common voltage line CL_H disposed inside the display panel 110 is disposed adjacent to the gate line GL and the data line DL. Thus, when the level of the signal applied to the gate line GL and the data line DL is drastically varied, the common voltage Vcom applied to the horizontal common voltage line CL_H may be distorted by the mutual parasitic capacitance. This is the major cause of crosstalk.

To address this issue, the common voltage compensation circuit 150 is structured to receive the fed back of the common voltage Vcom applied to the display panel 110 and adjust the level of the common voltage Vcom reflecting common voltage variations.

For the above purpose, the display panel 110 includes the left feedback line FL_L connected to an end of the left common voltage line CL_L, and the right feedback line FL_R connected to an end of the right common voltage line CL_R to allow the varied common voltage Vcom to be transferred to the common voltage compensation circuit 150 via the each feedback line FL.

Figure 2:
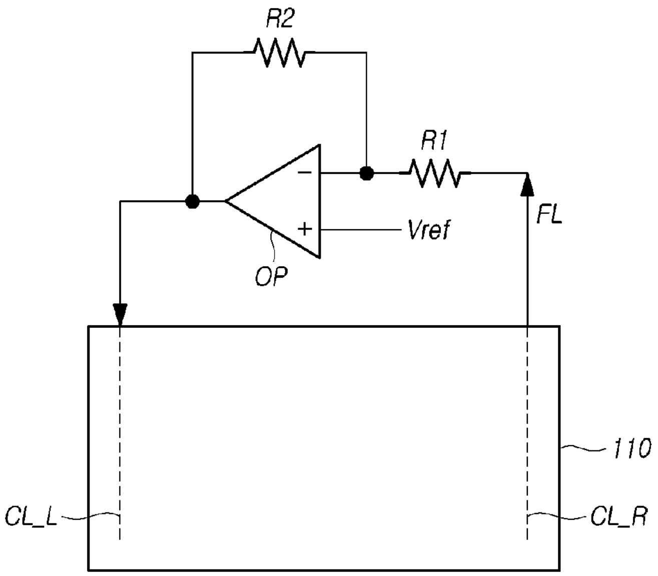
FIG. 2 is a circuit diagram illustrating an example common voltage compensation circuit used in a display device according to an embodiment.

FIG. 2 is a circuit diagram illustrating an example common voltage compensation circuit used in a display device.

Referring to FIG. 2, the common voltage compensation circuit 150 used in the display device 100 includes an operational amplifier OP with an inverting input terminal (−) for receiving the common voltage Vcom fed back from the display panel 110 via a first resistor R1 and a non-inverting input terminal (+) for receiving a reference voltage Vref.

Since a second resistor R2 is connected between the inverting input terminal (−) and output terminal of the operational amplifier OP, the operational amplifier OP inversely amplifies the fed-back common voltage Vcom according to the ratio of the first resistance R1 to the second resistance R2, thereby outputting a compensated common voltage Vcom.

As such, as the inversely amplified common voltage Vcom is supplied to the display panel 110, the distorted component of the original common voltage Vcom is compensated by the compensated common voltage Vcom via the operational amplifier OP. The compensation for the common voltage Vcom by the common voltage compensation circuit 150 is performed every frame.

The larger the area the display panel 110 has, the longer the horizontal common voltage line CL_H disposed in the display panel 110 is. Thus, the deviation in common voltage Vcom increases between the edges of both sides supplied with the common voltage Vcom and the middle in the display area of the display panel 110.

Figure 3A:
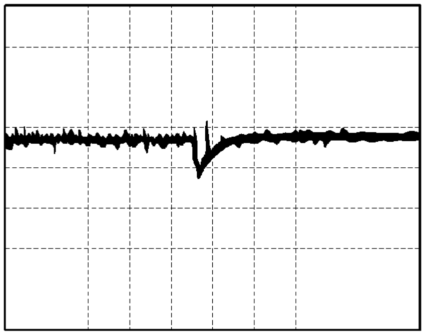
FIGS. 3A and 3B are views illustrating an occasion where a common voltage distortion and afterimage occur due to the time delay of common voltage in a display device.
Figure 3B:
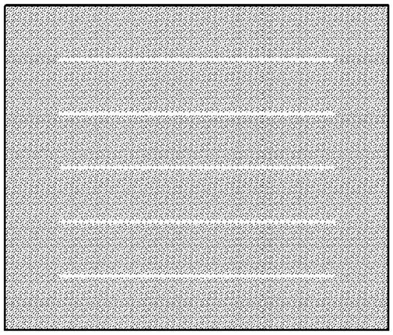

Resultantly, the common voltage Vcom causes ripples in the middle of the display panel 110 as shown in FIG. 3A and, thus, an afterimage occurs due to the deviation in common voltage Vcom in the display panel 110 as shown in FIG. 3B.

To address such issues, in the display device 100 according to the disclosure, one or more vertical common voltage lines CL_V, which are electrically connected with the horizontal common voltage line CL_H for supplying the common voltage Vcom along a first direction of the display panel 110, are added in a vertical direction crossing the horizontal common voltage line CL_H to reduce the time delay of the common voltage Vcom supplied to the display panel 110, thereby reducing quality deterioration due to signal ripples and afterimages.

Figure 4:
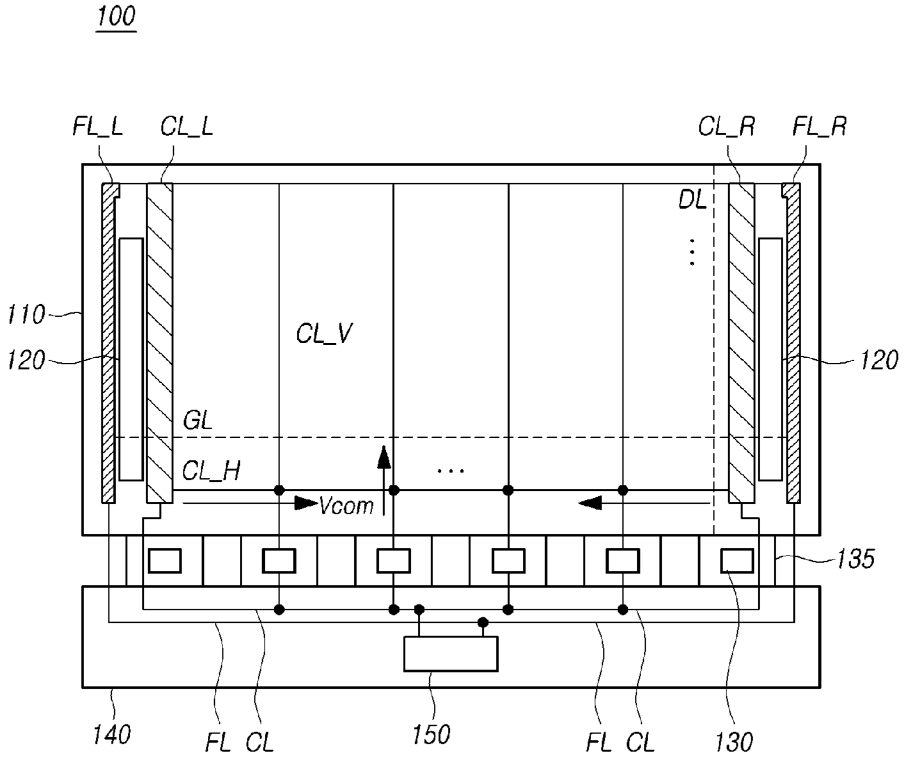
FIG. 4 is a block diagram illustrating a display device according to an embodiment.

FIG. 4 is a block diagram illustrating a display device according to an embodiment.

Referring to FIG. 4, according to an embodiment of the disclosure, a display device 100 includes a display panel 110 including a horizontal common voltage line CL_H and a vertical common voltage line CL_V, a flexible printed circuit board 135 in which a data driving circuit 130 is mounted, and a common voltage compensation circuit 150 for supplying common voltage Vcom to the horizontal common voltage line CL_H and the vertical common voltage line CL_V.

Gate driving circuits 120 are mounted on both side edges of the display panel 110 and, a first common voltage line CL_L and a first feedback line FL_L and a second common voltage line CL_R and a second feedback line FL_R are formed in the areas adjacent to the gate driving circuits 120.

Although a gate driving circuit 120 may be formed on only one side edge of the display panel 110, the charging of the pixel areas positioned opposite may be delayed due to the resistance of the gate line GL, and the on/off of the thin film transistor TFT may not work properly. Thus, in one embodiment a gate driving circuit 120 is placed on both side edges of the display panel 110.

To reduce contact with the gate line GL when the gate driving circuit 120 applies gate driving voltage to the display panel 110 through the gate line GL, the first common voltage line CL_L and the second common voltage line CL_R may be disposed between the gate driving circuit 120 and the display area while the first feedback line FL_L and the second feedback line FL_R are disposed outside the gate driving circuit 120.

A plurality of gate lines GL and data lines DL cross each other to form pixel areas inside the display panel 110. Horizontal common voltage lines CL_H are arranged in the direction parallel with the gate line GL, and vertical common voltage lines CL_V are arranged in the direction parallel with the data line DL so that the lines CL_H and CL_V are electrically connected together at the crossing points.

The gate driving circuit 120 sequentially supplies gate driving voltages to the gate lines GL in each horizontal period (1H) according to a plurality of gate control signals from a timing controller (not shown) mounted on a main printed circuit board 140.

The data driving circuit 130 supplies data voltages to the pixel areas through all the data lines DL in each horizontal period (1H) in response to data control signals from the timing controller. In other words, the data driving circuit 130 applies data voltage to the display panel 110 in synchronization with the gate driving voltage from the gate driving circuit 120.

Where the display panel 110 includes a touch driving circuit for sensing a touch and its coordinates, the data driving circuit 130 and the touch driving circuit may be integrated into a single integrated circuit (SRIC).

The common voltage compensation circuit 150 may receive power voltage and generate a predetermined level of common voltage Vcom for driving the display panel 110. The common voltage Vcom generated from the common voltage compensation circuit 150 is applied along the common voltage line CL, through the left first common voltage line CL_L and the right second common voltage line CL_R to the horizontal common voltage line CL_H disposed in the display panel 110 and is also applied through the data driving circuit 130 or integrated circuit SRIC to the vertical common voltage line CL_V disposed in the display panel 110.

In both the side edge areas of the display panel 110, the first feedback line FL_L connected with the first common voltage line CL_L and the second feedback line FL_R connected with the second common voltage line CL_R are formed, and the common voltage compensation circuit 150 receives the fed back of the common voltage Vcom applied to the display panel 110, via the first feedback line FL_L and the second feedback line FL_R.

The first common voltage line CL_L and the second common voltage line CL_R are connected with the output terminal of the common voltage compensation circuit 150 via the common voltage line CL formed on the flexible printed circuit board 135 and the main printed circuit board 140.

The vertical common voltage line CL_V may be connected to the common voltage line CL formed on the main printed circuit board 140 through the data driving circuit 130 or integrated circuit SRIC, and the data driving circuit 130 or integrated circuit SRIC may form the vertical common voltage line CL_V through the terminal where data line DL supplying data voltage to the display panel 110 is not formed.

The first common voltage line CL_L and the first feedback line FL_L, the second common voltage line CL_R and the second feedback line FL_R, and the horizontal common voltage line CL_H and vertical common voltage line CL_V disposed on the display panel 110 may be formed of the same material on the same layer as, or of a different material on a different layer from, the common voltage line CL extending from the main printed circuit board 140.

The vertical common voltage line CL_V connected from the data driving circuit 130 or integrated circuit SRIC to the display panel 110 may be formed as a plurality of lines connected to the jumping line to reduce the signal delay of the applied common voltage Vcom or a reduction in signal level.

The number, position, thickness, or length of such vertical common voltage lines CL_V may be varied depending on the characteristics of the display panel 110.

By such a structure, the common voltage compensation circuit 150 applies the common voltage Vcom from both sides of the display panel 110 along the horizontal direction, reducing the deviation in common voltage Vcom for the horizontal direction of the display panel 110. Also, the common voltage compensation circuit 150 simultaneously applies the common voltage Vcom through the data driving circuit 130 or integrated circuit SRIC along the vertical direction, thereby reducing the deviation in the common voltage Vcom for the vertical direction.

Figure 5:
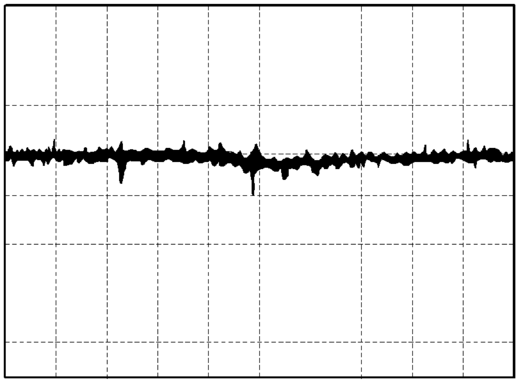
FIG. 5 is a view illustrating an example in which a common voltage distortion is reduced in a center area of a display panel in a display device according to an embodiment.

Thus, as shown in FIG. 5, ripples of the common voltage Vcom in the middle of the display panel 110 may be reduced, and quality deterioration may be reduced.

In the display device 100 according to the disclosure, the vertical common voltage line CL_V disposed on the display panel 110 from the data driving circuit 130 or integrated circuit SRIC along the vertical direction may be formed in the process of forming any metal layer, such as the gate layer or source/drain layer, among the plurality of metal layers constituting the display panel 110.

FIGS. 6A and 6B and 7A and 7B are cross-sectional views illustrating an example in which a vertical common voltage line is formed in a gate layer or source/drain layer in a display device according to an embodiment.

Referring to FIG. 6, in the display panel 110 of the display device 100 according to an embodiment of the disclosure, a polyimide layer (not drawn), a buffer layer (not drawn), and an inter-layer insulation film INS may sequentially be formed on a substrate (not drawn), and a gate layer GATE may be formed on the inter-layer insulation film INS.

Figure 6A:
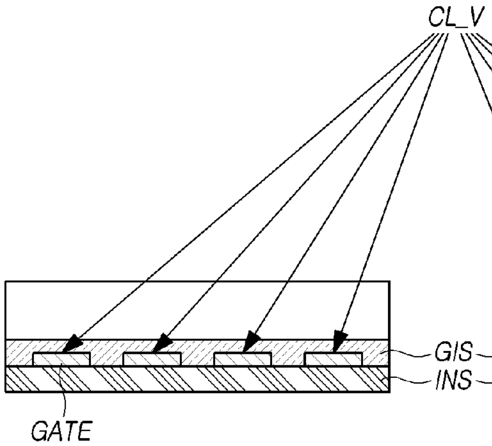
FIGS. 6A, 6B, 7A and 7B are cross-sectional views illustrating an example in which a vertical common voltage line is formed in a gate layer or source/drain layer in a display device according to an embodiment.

The gate layer GATE is formed of a conductive metal layer for forming a gate electrode. In the process of forming the gate electrode, a vertical common voltage line CL_V extending from some extra terminal of the data driving circuit 130 or integrated circuit SRIC may be formed and be used as a wire to apply common voltage Vcom to the display panel 110 along the vertical direction (FIG. 6A). In the shown example, the vertical common voltage line CL_V connected to the display panel 110 includes four wires.

A gate insulation film GIS may be formed on the gate layer GATE, and a source/drain layer S/D may be formed on the gate insulation film GIS.

Figure 6B:
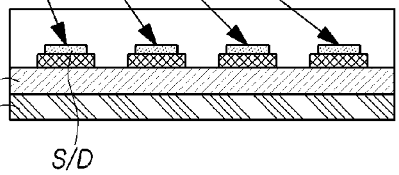

Source/drain electrodes or signal lines such as the gate line GL or data line DL may be formed in the source/drain layer S/D. The source/drain layer S/D may be used to form the vertical common voltage line CL_V connected to the display panel 110 (FIG. 6B).

In the display device 100 according to the disclosure, a plurality of vertical common voltage lines CL_V connected to the display panel 110 from the data driving circuit 130 or integrated circuit SRIC along the vertical direction may be formed of a single metal layer constituting the gate layer GATE or source/drain layer S/D. However, as shown in FIG. 7, some vertical common voltage lines CL_V may be formed in the gate layer GATE while other vertical common voltage lines CL_V may be formed in the source/drain layer S/D.

Figure 7A:
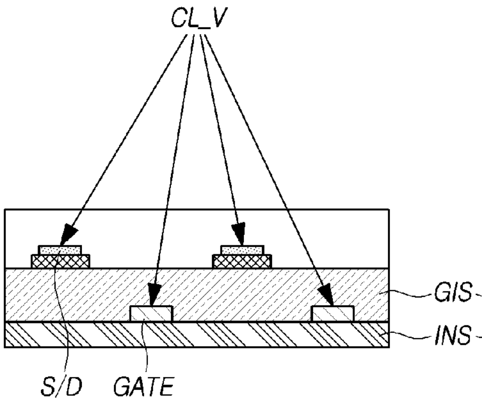

For example, among the vertical common voltage lines CL_V, odd-numbered vertical common voltage lines CL_V may be formed in the source/drain layer S/D, and even-numbered vertical common voltage lines CL_V may be formed in the gate layer GATE. Alternatively, odd-numbered vertical common voltage lines CL_V may be formed in the gate layer GATE, and even-numbered vertical common voltage lines CL_V may be formed in the source/drain layer S/D (FIG. 7A).

Figure 7B:
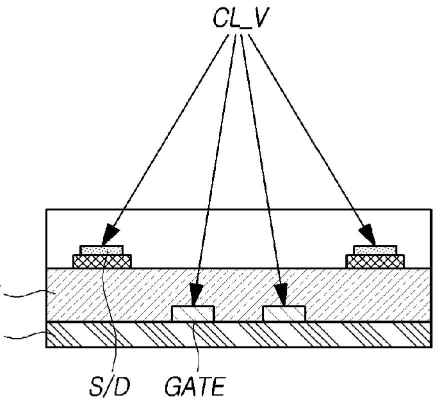

Alternatively, the first and fourth vertical common voltage lines CL_V may be formed in the source/drain layer S/D, and the second and third vertical common voltage lines CL_V may be formed in the gate layer GATE (FIG. 7B). As such, the plurality of vertical common voltage lines CL_V may be formed alternately in the gate layer GATE and the source/drain layer S/D in any order.

The common voltage Vcom applied to the display panel 110 may have a time delay inside the display panel 110, or have a time delay or a reduction in voltage level even when the common voltage Vcom is applied from the data driving circuit 130 or integrated circuit SRIC to the display panel 110.

For solving the above problem, the common voltage Vcom may be supplied to the dual structure of the gate layer GATE and source/drain layer S/D at inter-connected portion between the data driving circuit 130 or integrated circuit SRIC and the display panel 110. Also, forming the vertical common voltage line CL_V with a jumping wire connecting the gate layer GATE to the source/drain layer S/D in the portion connecting to the display panel 110, the efficiency of supplying the common voltage Vcom may be increased.

Figure 8:
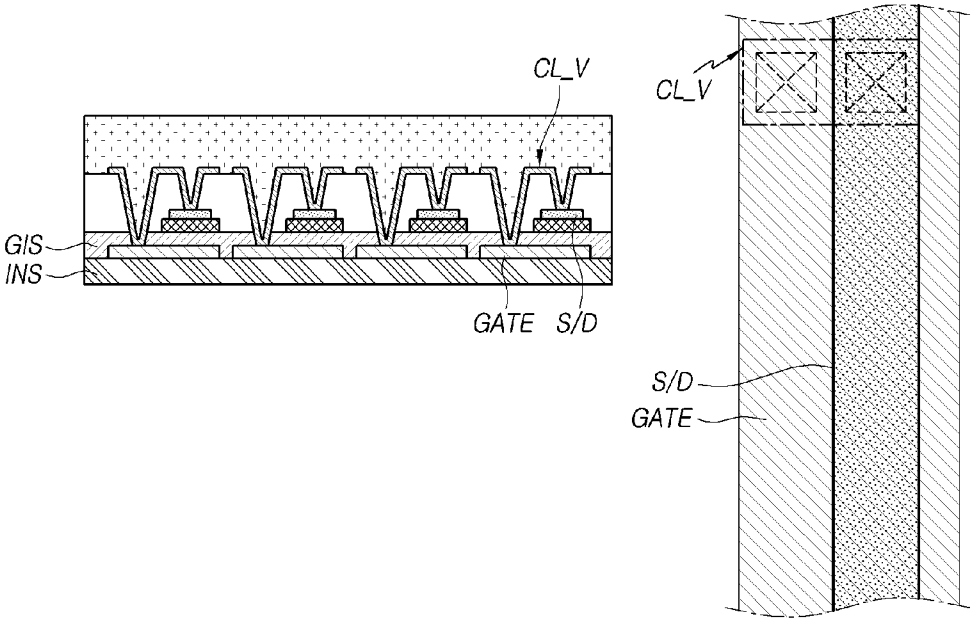
FIG. 8 is a view illustrating an example in which a vertical common voltage line is formed by connecting double wires on a gate layer and a source/drain layer by a jumping wire in a display device according to an embodiment.

FIG. 8 is a view illustrating an example in which a vertical common voltage line is formed by connecting double wires formed on a gate layer and a source/drain layer by a jumping wire in a display device according to an embodiment.

Referring to FIG. 8, in the display device 100, according to the disclosure, the vertical common voltage line CL_V connected to the display panel 110 along the vertical direction may have dual lines with the gate layer GATE and the source/drain layer S/D in a portion extending from the data driving circuit 130 or integrated circuit SRIC, and may be formed by connecting the gate layer GATE to the source/drain layer S/D via a jumping wire in a portion connecting to the display panel 110.

The double wires extending from the data driving circuit 130 or integrated circuit SRIC to supply common voltage Vcom and formed on the gate layer GATE and the source/drain layer S/D may be arranged in parallel to the display panel 110.

As such, the level of common voltage Vcom applied to the display panel via the dual lines with the gate layer GATE and the source/drain layer S/D may be prevented from being decreased.

In the display device 100 according to the disclosure, the number of vertical common voltage lines CL_V connected to the display panel 110 may be varied.

Figure 9:
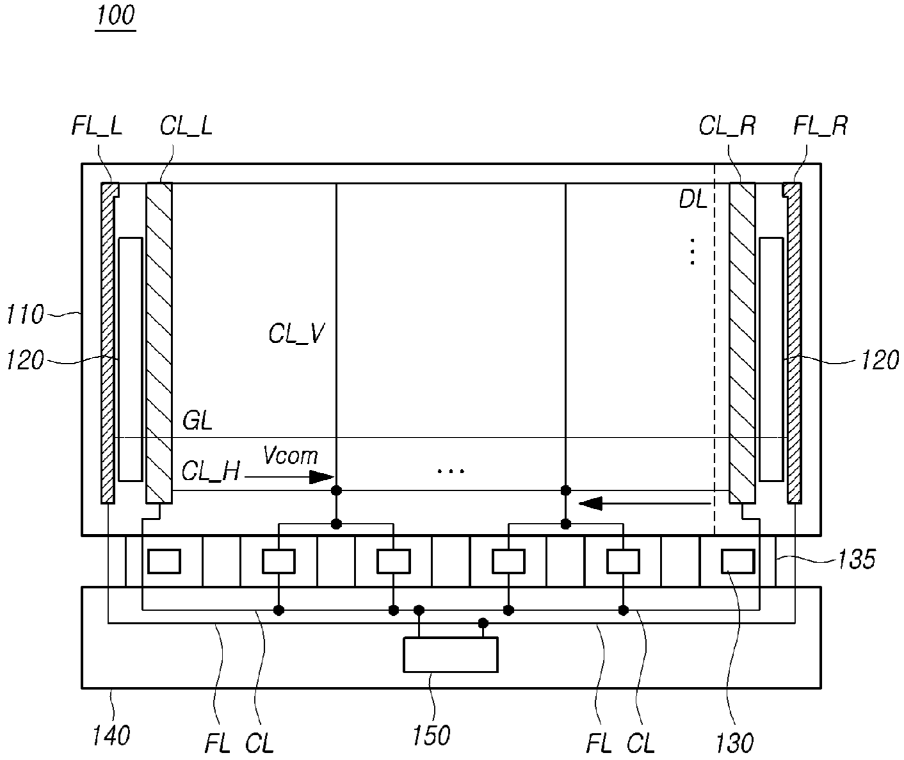
FIG. 9 is a view illustrating an example in which fewer vertical common voltage lines than data driving circuits or integrated circuits are formed in a display device according to an embodiment.

FIG. 9 is a view illustrating an example in which fewer vertical common voltage lines than data driving circuits or integrated circuits are formed in a display device according to an embodiment.

Referring to FIG. 9, according to an embodiment of the disclosure, in a display device 100, one vertical common voltage line CL_V, which is connected to the display panel 110 in the vertical direction, may extend from each data driving circuit 130 or integrated circuit SRIC or, considering a size of the display panel 110, a structure of signal lines, and a structure of the data driving circuit 130 or integrated circuit SRIC, fewer vertical common voltage lines CL_V than data driving circuits 130 or integrated circuits SRIC may be configured.

In this case, the common voltage Vcom wires extending from the plurality of data driving circuits 130 or integrated circuits may be connected to a single vertical common voltage line CL_V that is then connected to the display panel 110.

As such, when lines of the common voltage Vcom extending from the plurality of data driving circuits 130 or integrated circuits are connected to a single vertical common voltage line CL_V, the common voltages Vcom from the plurality of data driving circuits 130 or integrated circuits may be supplied via one vertical common voltage line CL_V. Thus, the signal attenuation or delay of the common voltage Vcom may be reduced.

Figure 10:
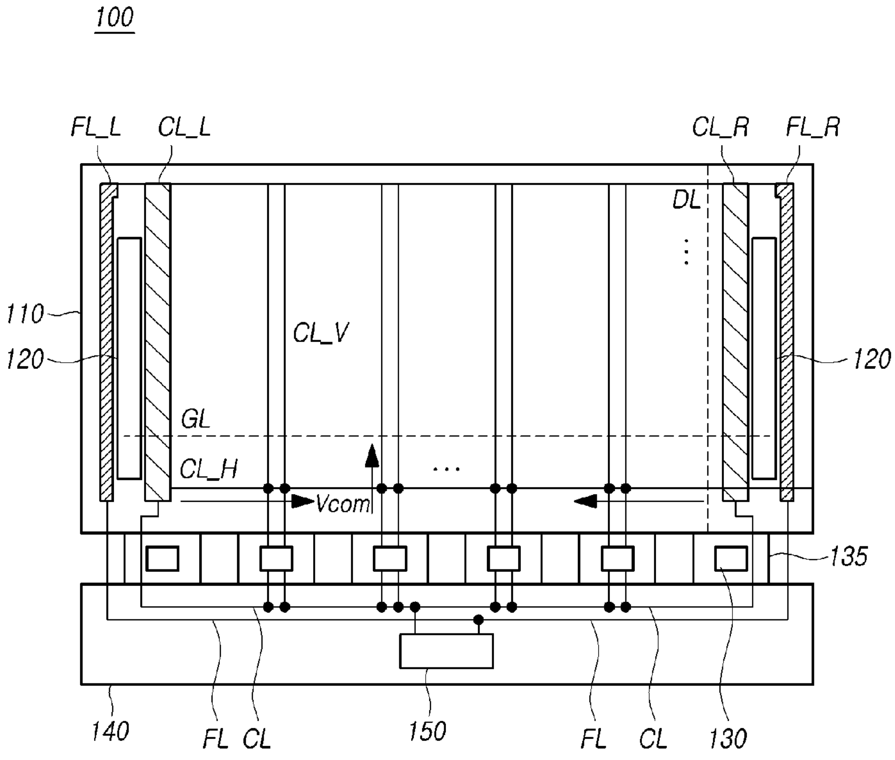
FIG. 10 is a view illustrating an example in which more vertical common voltage lines than data driving circuits or integrated circuits are formed in a display device according to an embodiment.

FIG. 10 is a view illustrating an example in which more vertical common voltage lines than data driving circuits or integrated circuits are formed in a display device according to an embodiment.

Referring to FIG. 10, according to an embodiment of the disclosure, in a display device 100, one vertical common voltage line CL_V, which is connected to the display panel 110 in the vertical direction, may extend from each data driving circuit 130 or integrated circuit SRIC or, considering a size of the display panel 110, a structure of signal lines, and a structure of the data driving circuit 130 or integrated circuit SRIC, two or more vertical common voltage lines CL_V may extend from each data driving circuit 130 or integrated circuit SRIC.

In this case, the plurality of vertical common voltage lines CL_V may extend from each data driving circuit 130 or integrated circuit SRIC through terminals, not intended for data lines, of the data driving circuit 130 or integrated circuit SRIC.

As such, as two or more vertical common voltage lines CL_V are formed from each data driving circuit 130 or integrated circuit SRIC, the number of vertical common voltage lines CL_V may increase. Thus, the common voltage Vcom transferred through the horizontal common voltage line CL_H may be effectively reduced from a reduction in signal level or signal delay in the display panel 110.

In the opposite side (the top of the display panel 110) of the data driving circuit 130 or integrated circuit SRIC, which is positioned away from the data driving circuit 130 or integrated circuit SRIC, a decrease of signal level or signal delay may occur while the common voltage Vcom is transferred.

Thus, an extra auxiliary horizontal common voltage line ACL_H may be disposed in the edge area of the display panel opposite to the data driving circuit 130 or integrated circuit SRIC supplying the common voltage Vcom to allow the common voltage Vcom to be transferred through any node to the horizontal common voltage line CL_H in the display area. So, a decrease of signal level or signal delay of the common voltage Vcom in the display panel 110 may be effectively reduced.

Figure 11:
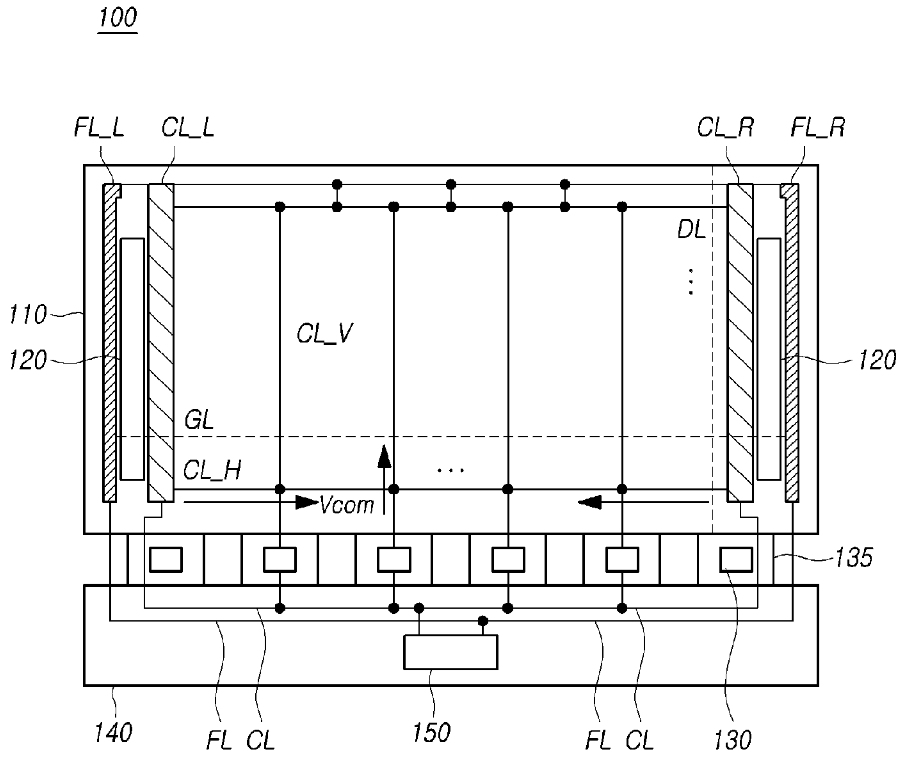
FIG. 11 is a view illustrating an example in which a dual horizontal common voltage line structure is formed on the opposite side of a data driving circuit or integrated circuit in a display device according to an embodiment.

FIG. 11 is a view illustrating an example in which a dual horizontal common voltage line structure is formed on the opposite side of a data driving circuit or integrated circuit in a display device according to an embodiment.

Referring to FIG. 11, in a display device 100 according to an embodiment of the disclosure, when data driving circuits 130 or integrated circuits SRIC are positioned on one side, e.g., the bottom, of the display panel 110 to supply common voltage Vcom, the common voltage Vcom flowing through a horizontal common voltage line CL_H positioned on the opposite side of the data driving circuits 130 or integrated circuits SRIC, i.e., at the top of the display panel 110, may have a decrease of a signal level or signal delay while transferred.

Thus, an auxiliary horizontal common voltage line ACL_H may be formed in parallel in the edge area of the display panel 110 opposite to the data driving circuits 130 or integrated circuits SRIC to allow the common voltage Vcom to be supplied through one or more connection nodes to the horizontal common voltage line CL_H positioned in the display area.

As such, forming an auxiliary horizontal common voltage line ACL_H in the edge area of the display panel 110 opposite to the data driving circuits 130 or integrated circuits SRIC may effectively reduce a signal level lowering or signal delay of the common voltage Vcom transferred to the horizontal common voltage line CL_H positioned in the opposite display area of the data driving circuits 130 or integrated circuits SRIC.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present disclosure.

What is claimed is:

1. A display device, comprising:

a display panel including a left common voltage line and a right common voltage line formed along two opposite side edge areas, a plurality of horizontal common voltage lines connecting the left common voltage line and the right common voltage line and arranged in a display area, and a plurality of vertical common voltage lines arranged to cross the plurality of horizontal common voltage lines;

a printed circuit board having one or more integrated circuits formed thereon to supply a data voltage through a data line to the display panel; and a common voltage compensation circuit supplying a common voltage to the left common voltage line and the right common voltage line while simultaneously supplying the common voltage through the one or more integrated circuits to the plurality of vertical common voltage lines, wherein each of the plurality of vertical common voltage lines is formed on a gate layer or a source/drain layer.

2. The display device of claim 1, wherein the left common voltage line and the right common voltage line are connected to a left feedback line and a right feedback line which are disposed outside a gate driving circuit supplying a gate driving voltage to the display area, respectively, to feed the common voltage back to the common voltage compensation circuit.

3. The display device of claim 2, wherein the common voltage compensation circuit includes an operational amplifier receiving, via a first resistor and an inverting input terminal, the common voltage fed back from the display panel through the left feedback line or the right feedback line and a reference voltage via a non-inverting input terminal.

4. The display device of claim 2, wherein the gate driving circuit is placed over each of both side edges of the display panel.

5. The display device of claim 1, wherein the plurality of vertical common voltage lines include one or more signal lines connected from one of the one or more integrated circuits to the display panel.

6. The display device of claim 1, wherein the plurality of vertical common voltage lines are merged from a plurality of ones of the one or more integrated circuits into one signal line connected to the display panel.

7. The display device of claim 1, wherein each of the plurality of vertical common voltage lines is formed alternately on the gate layer and the source/drain layer.

8. The display device of claim 1, wherein each of the plurality of vertical common voltage lines includes:

a first signal line extending from one of the one or more integrated circuits and formed on the gate layer;

a second signal line extending from the one of the one or more integrated circuits and formed on the source/drain layer in a direction parallel with the gate layer; and a jumping wire connecting the first signal line and the second signal line and connected to the display panel.

9. The display device of claim 1, further comprising an auxiliary horizontal common voltage line disposed in an edge area of the display panel opposite to the one or more integrated circuits, wherein the auxiliary horizontal common voltage line is connected to the horizontal common voltage lines positioned in the display area, in one or more nodes.

10. The display device of claim 1, wherein the plurality of horizontal common voltage lines and the plurality of vertical common voltage lines are electrically connected together at crossing points of the plurality of horizontal common voltage lines.

11. A method for driving a display device, the method comprising:

supplying a common voltage to a plurality of horizontal common voltage lines through a left common voltage line and a right common voltage line formed along two opposite side edge areas, the plurality of horizontal common voltage lines connected with the left common voltage line and the right common voltage line and arranged in a display area of a display panel;

supplying the common voltage to a plurality of vertical common voltage lines arranged to cross the plurality of horizontal common voltage lines;

receiving the common voltage fed back from the display panel, through a feedback line connected to the left common voltage line or the right common voltage line; and compensating for the fed-back common voltage according to a predetermined compensation ratio and outputting the compensated fed-back common voltage, wherein each of the plurality of vertical common voltage lines is formed on a gate layer or a source/drain layer.

12. The method of claim 11, wherein the left common voltage line and the right common voltage line are connected to a left feedback line and a right feedback line which are disposed outside a gate driving circuit supplying a gate driving voltage to the display area, respectively, to feed the common voltage back to a common voltage compensation circuit.

13. The method of claim 12, wherein the gate driving circuit is placed over each of both side edges of the display panel.

14. The method of claim 11, wherein each of the plurality of vertical common voltage lines is formed alternately on the gate layer and the source/drain layer.

15. The method of claim 11, wherein each of the plurality of vertical common voltage lines includes:

a first signal line formed on the gate layer;

a second signal line formed on the source/drain layer in a direction parallel with the gate layer; and a jumping wire connecting the first signal line and the second signal line and connected to the display panel.

16. The method of claim 11, further comprising an auxiliary horizontal common voltage line disposed in an opposite edge area of integrated circuits with respect to the display panel, wherein the auxiliary horizontal common voltage line is connected to the plurality of horizontal common voltage lines positioned in the display area, in one or more nodes.

17. The method of claim 11, wherein the plurality of horizontal common voltage lines and the plurality of vertical common voltage lines are electrically connected together at crossing points of the plurality of horizontal common voltage lines and the plurality of vertical common voltage lines.

* * * * *